(12) United States Patent
Song

(10) Patent No.: US 7,482,857 B2
(45) Date of Patent: Jan. 27, 2009

(54) UNIFIED BANDGAP VOLTAGE AND PTAT CURRENT REFERENCE CIRCUIT

(75) Inventor: Hongjiang Song, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 474 days.

(21) Appl. No.: 10/461,061

(22) Filed: Jun. 13, 2003

(65) Prior Publication Data

US 2005/0003767 A1    Jan. 6, 2005

(51) Int. Cl.
*G05F 1/10* (2006.01)
(52) U.S. Cl. .................. 327/538; 327/540; 327/541
(58) Field of Classification Search .......... 327/538–543
See application file for complete search history.

(56) References Cited

U.S. PATENT DOCUMENTS

| 4,857,823 | A | * | 8/1989 | Bitting | 323/314 |
| 5,329,184 | A | * | 7/1994 | Redfern | 326/66 |
| 5,453,679 | A | * | 9/1995 | Rapp | 323/313 |
| 5,955,873 | A | * | 9/1999 | Maccarrone et al. | 323/314 |
| 6,894,473 | B1 | * | 5/2005 | Le et al. | 323/314 |
| 6,972,550 | B2 | * | 12/2005 | Hong | 323/315 |

* cited by examiner

*Primary Examiner*—Kenneth B. Wells
(74) *Attorney, Agent, or Firm*—Kacvinsky LLC

(57) ABSTRACT

A circuit provides a bandgap reference voltage that is substantially insensitive to temperature variations of an operating reference circuit.

9 Claims, 3 Drawing Sheets

UNIFIED BANDGAP VOLTAGE AND PTAT CURRENT REFERENCE CIRCUIT

Some of today's portable communication products such as cellular telephones and laptop computers may require a stable and accurate reference voltage for effective operation. However, reference voltages may not remain constant due to temperature variations that occur during operation. A circuit known as a bandgap reference voltage generator has been used to compensate for the temperature dependence of reference voltages and provide a constant reference voltage.

It would be advantageous to have an improved method and circuit for providing a stable and accurate reference voltage and a reference current.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Embodiments of the present invention may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in smart phones, communicators and Personal Digital Assistants (PDAs), medical or biotech equipment, automotive safety and protective equipment, and automotive infotainment products. However, it should be understood that the scope of the present invention is not limited to these examples.

Figure 1:
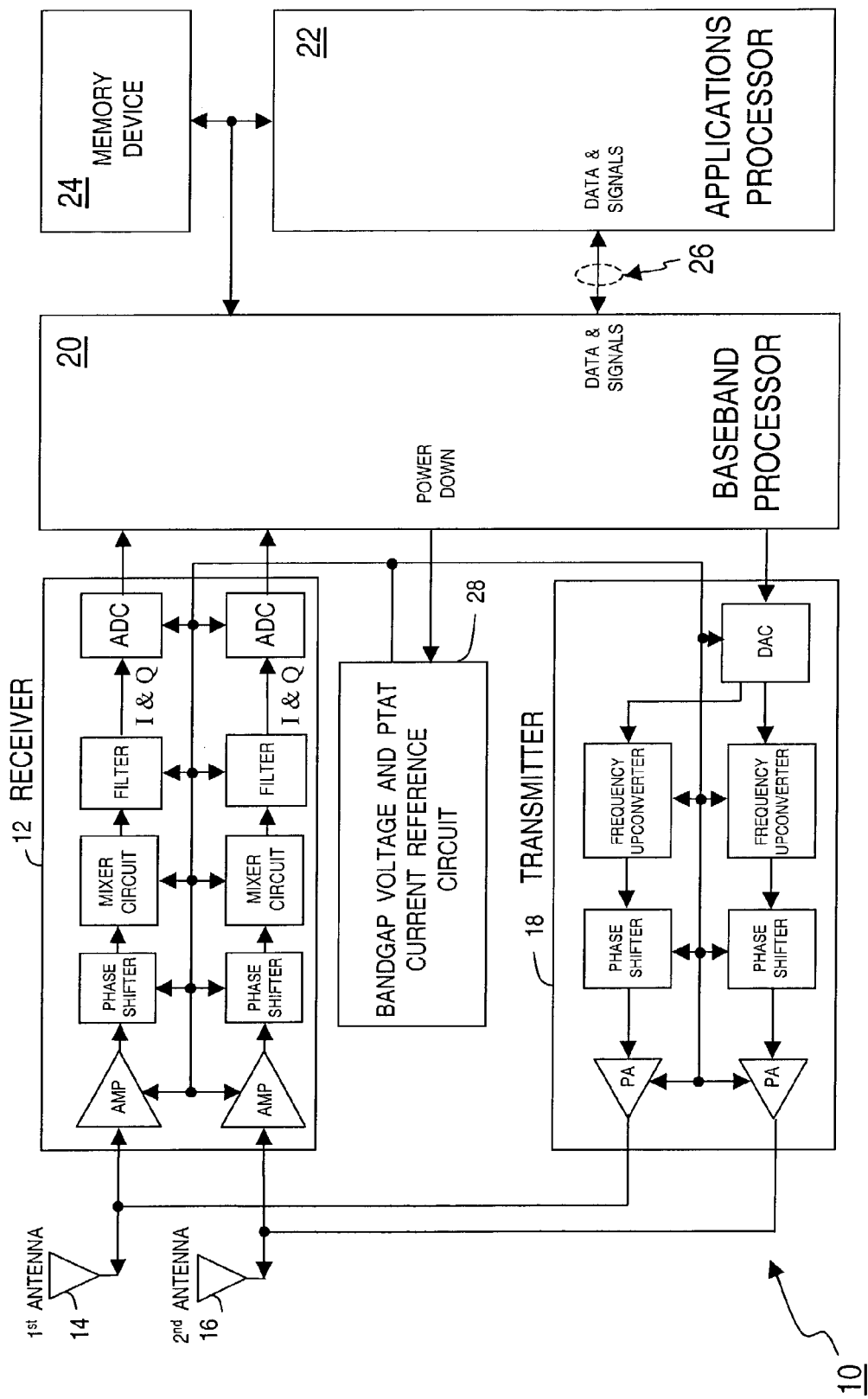
FIG. 1 illustrates a wireless communications device having features for generating a bandgap reference voltage and a reference current in accordance with the present invention.

FIG. 1 illustrates features of the present invention that may be used to generate a bandgap voltage and a Proportional-To-Absolute-Temperature (PTAT) current reference that may be incorporated into a wireless communications device 10. In this device the transceiver receives and transmits modulated signals from antennas 14 and 16, although a single antenna or multiple antennas are not a limitation of the present invention. As shown, the first and second receiver chains may each include amplifiers such as, for example, Low Noise Amplifiers (LNAs) and Variable Gain Amplifiers (VGAs) to amplify signals received from the multiple antennas. Mixer circuits receive the modulated signals in the first and second receiver chains and down-convert the carrier frequency of the modulated signals. The down-converted signals may then be filtered and converted to a digital representation by Analog-To-Digital Converters (ADCs).

A baseband processor 20 may be connected to the ADCs to provide, in general, the digital processing of the received data within communications device 10. Baseband processor 20 may process the digitized quadrature signals, i.e., the in-phase "I" signal and the quadrature "Q" signal from the first and second receiver chains. In order for wireless communications device 10 to transmit data, transmitter 18 may receive digital data processed by baseband processor 20 and use the Digital-to-Analog Converter (DAC) to convert the digital data to analog signals for transmission from multiple antennas 14 and 16.

A bandgap voltage and PTAT current reference circuit 28 may be connected to the ADCs and DACs to supply stable and reliable reference voltages and currents. The accuracy of various analog RF circuits is directly determined by the accuracy of the generated voltage reference and the highly stable current biasing that is critical for the performance of these high accuracy circuits. By way of example, circuit 28 may supply a voltage reference and/or a stable current to low noise amplifiers, phase shifters, mixer circuits, filters, ADCs, power amplifiers, DACs, etc. Note that receiver 12 and/or transmitter 18 may be embedded with baseband processor 20 as a mixed-mode integrated circuit, or alternatively, the transceiver may be a stand-alone Radio Frequency (RF) integrated circuit. Circuit 28 may also be a stand-alone circuit such as, for example, an Application Specific Integrated Circuit (ASIC). On the other hand, circuit 28 may be embedded with baseband processor 20 to provide a radio function on a mixed-signal integrated circuit.

An applications processor 22 may be connected to baseband processor 20 through a signaling interface 26 that allows data to be transferred between baseband processor 20 and applications processor 22. A memory device 24 may be connected to baseband processor 20 and applications processor 22 to store data and/or instructions. In some embodiments, memory device 24 may be a volatile memory such as, for example, a Static Random Access Memory (SRAM), a Dynamic Random Access Memory (DRAM) or a Synchronous Dynamic Random Access Memory (SDRAM), although the scope of the claimed subject matter is not limited in this respect. In alternate embodiments, the memory devices may be nonvolatile memories such as, for example, an Electrically Programmable Read-Only Memory (EPROM), an Electrically Erasable and Programmable Read Only Memory (EEPROM), a flash memory (NAND or NOR type, including multiple bits per cell), a Ferroelectric Random Access Memory (FRAM), a Polymer Ferroelectric Random Access Memory (PFRAM), a Magnetic Random Access Memory (MRAM), an Ovonics Unified Memory (OUM), a disk memory such as, for example, an electromechanical hard disk, an optical disk, a magnetic disk, or any other device capable of storing instructions and/or data. However, it should be understood that the scope of the present invention is not limited to these examples.

Figure 2:
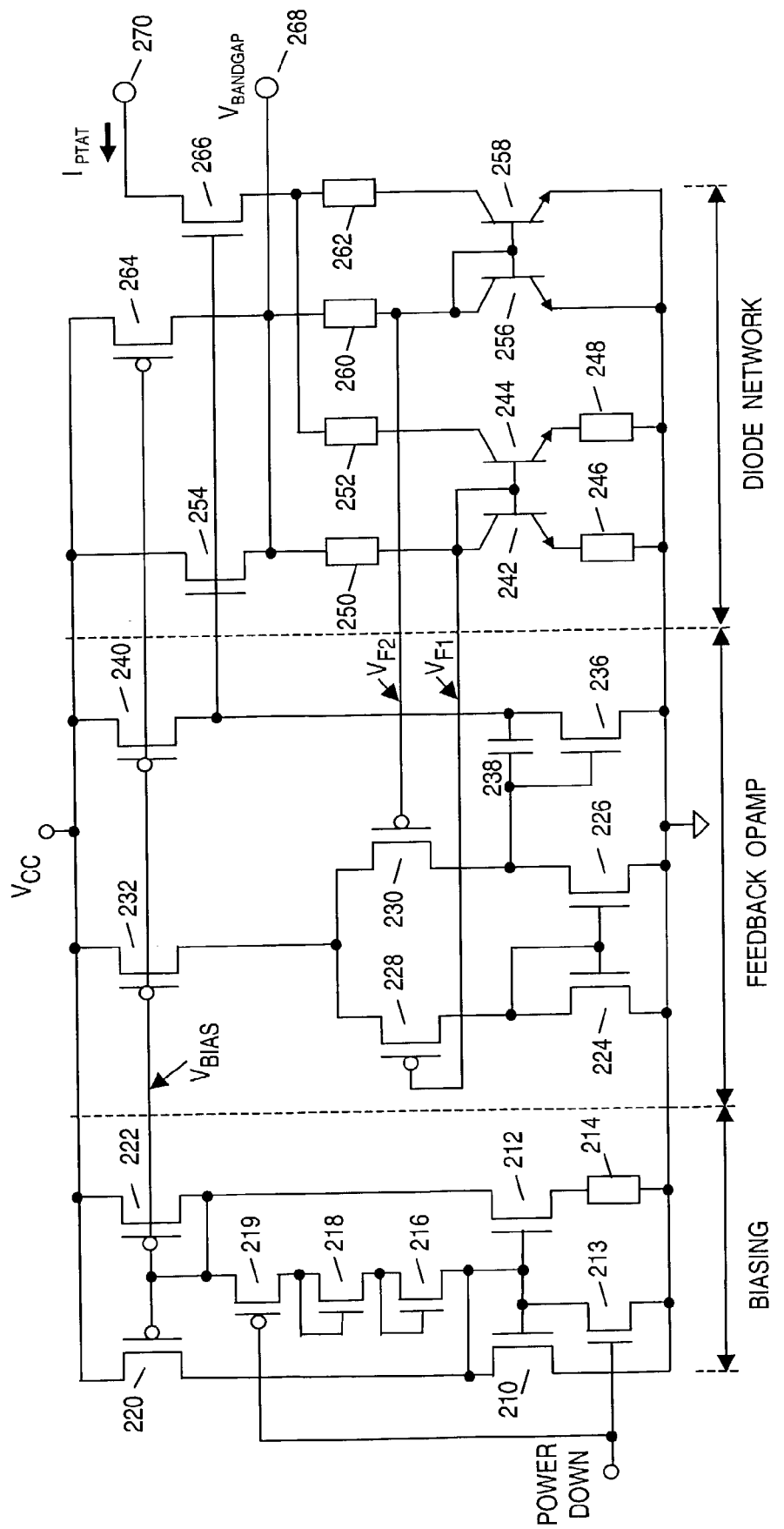
FIG. 2 is a diagram that illustrates an embodiment for generating the bandgap reference voltage and reference current.

FIG. 2 is a circuit diagram of a bandgap voltage and PTAT current reference circuit 28 having a biasing section, a feedback operational amplifier (OPAMP) and a diode network. Collectively, these three circuit sections cooperate to provide a bandgap reference voltage $V_{BANDGAP}$ that is substantially insensitive to temperature variations and further provide a highly stable current $I_{PTAT}$.

The biasing section includes N-channel transistors 210, 212 and current mirrored P-channel transistors 220, 222. The gates of the N-channel transistors 210 and 212 are coupled though diode connected N-channel transistors 216 and 218 to the gates of the P-channel transistors 220 and 222. The gates of transistors 210 and 212 are connected to the drains of transistors 210 and 220 while the gates of transistors 220 and 222 are connected to the drains of transistors 212 and 222 to form a node that provides the voltage potential $V_{BIAS}$. The source terminal of transistor 210 is connected to a ground power conductor and the source terminal of transistor 212 is coupled through a resistor 214 to the ground power conductor. The source terminals of transistors 220 and 222 are connected to a power conductor that receives a voltage potential $V_{CC}$ that may range, for example, from about 2.5 to 3.3 volts. The voltage potential $V_{BIAS}$ has a voltage value that is below that of $V_{CC}$ by about 0.6 to 0.7 volt, which is a threshold voltage of the P-channel transistors. In this embodiment transistor 212 may be sized to be an integer multiple of transistor 210, although this is not a limitation of the present invention.

The biasing section further includes an N-channel transistor 213 and a P-channel transistor 219 that are controlled by the signal POWER DOWN. Transistor 213 couples the gates of transistors 210 and 212 to the ground power conductor. Transistor 219 couples the gate-drain connection of transistor 218 to the gates of transistors 220 and 222. When wireless communications device 10 operates in a power conservation mode, circuit 28 does not generate the reference voltage $V_{BANDGAP}$ and the current $I_{PTAT}$.

The diode network includes a bipolar transistor 242 mirrored with a bipolar transistor 256 and a bipolar transistor 244 mirrored with a bipolar transistor 258. The bases of transistors 242 and 244 are connected together and the emitters are coupled through respective resistors 246 and 248 to the ground conductor. The bases of transistors 256 and 258 are connected together and the emitters are connected to the ground conductor. In this embodiment, transistors 242 and 244 are the same size and transistors 256 and 258 are the same size by design. Also, transistors 242 and 244 are sized to be larger than transistors 256 and 258 by a value N, where N is an integer number.

The common base-collector connection of transistor 242 provides a feedback voltage potential $V_{F1}$, the common connection further being coupled through a resistor 250 to an output terminal 268. Similarly, the feedback voltage potential $V_{F2}$ is provided at the common base-collector connection of transistor 256 that is further coupled through a resistor 260 to the output terminal 268. The voltage potential $V_{BANDGAP}$ is provided from output terminal 268. An N-channel transistor 254 and a parallel connected P-channel transistor 264 couple the output terminal 268 to the power conductor that receives the voltage potential $V_{CC}$. The voltage potential $V_{BIAS}$ is supplied to the gate of transistor 264. The collectors of transistors 244 and 258 are coupled through respective resistors 252 and 262 to a common node that is further coupled through an N-channel transistor 266 to an output terminal 270. A current $I_{PTAT}$ is conducted at the output terminal 270.

The feedback operational amplifier includes N-channel transistors 224 and 226 having commonly connected gates and sources that connect to the ground power conductor. P-channel transistors 228 and 230 receive differential inputs $V_{F1}$ and $V_{F2}$, with the commonly connected sources of these transistors coupled through a P-channel transistor 232 to the power conductor receiving the voltage potential $V_{CC}$. The voltage potential $V_{BIAS}$ is supplied to the gate of transistor 232. The drain of transistor 228 is connected to the gate and drain of transistor 224 and the drain of transistor 226 is connected to the drain of transistor 230. An N-channel transistor 236 has a gate connected to the drain of transistor 226, a source connected to the ground power conductor, and a drain coupled to the gate by a capacitor 238. A P-channel transistor 240 has a source connected to the power conductor that receives the voltage potential $V_{CC}$, a gate that receives the bias voltage $V_{BIAS}$, and a drain that is connected to the drain of transistor 236 and to the gates of transistors 254 and 266.

It should be noted that resistors 214, 246, 248, 250, 252, 260 and 262 may be implanted resistors, but alternatively may be diffused resistors, discrete resistors, thin film resistors, metal film resistors, etc. In other words, the type of resistor is not a limitation of the present invention. However, resistors 250, 252, 260 and 262 are preferably the same type of resistor as resistors 246 and 248 and have a resistance that is M times higher, where M is an integer number. In this embodiment M may be selected to have a value of 8.

Figure 3:
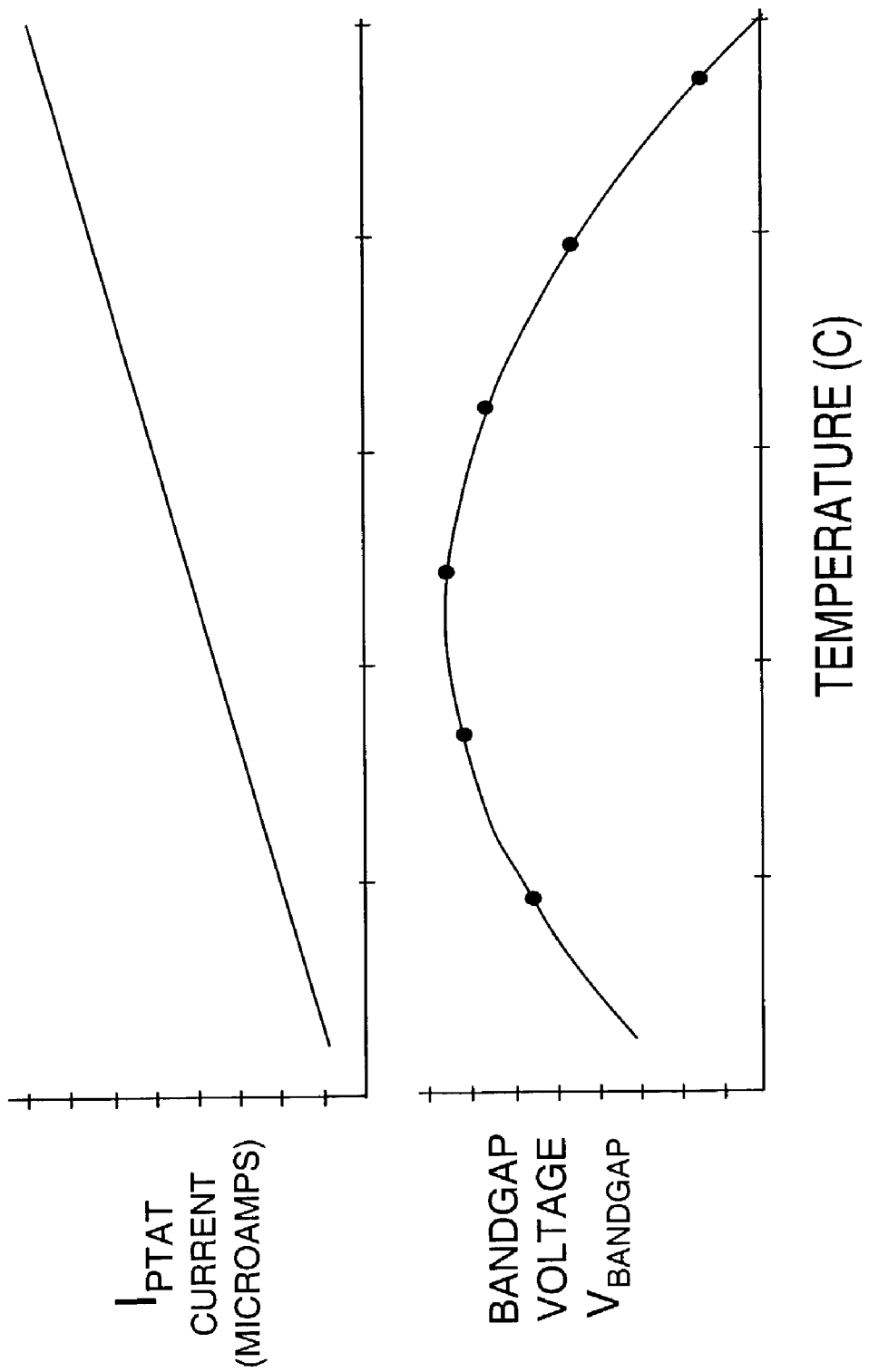
FIG. 3 is a diagram that illustrates variations in the PTAT current and bandgap voltage over temperature.

FIG. 3 shows both the linearity of the generated reference current $I_{PTAT}$ (see output terminal 270, FIG. 2) and the curvature of the generated bandgap voltage $V_{BANDGAP}$ (see output terminal 268) measured in millivolts (mv). The horizontal axis shows a temperature range of about −40° C. to about 160° C. One indication of the performance of the reference voltage generator is the shape of the waveform of the reference voltage versus temperature. The plot is characterized by the reference voltage increasing as the temperature is increased until an inflection temperature is reached, at which point the reference voltage decreases. The waveform illustrates the $V_{be}$ voltage drift nonlinearity over temperature and the curvature of this waveform is referred to as the characteristic bow of the temperature response.

In operation, circuit 28 may be implemented in a BiCMOS SiGe process technology, although this is not a limitation to the present invention. A constant-gm-biasing design in the biasing circuitry provides a signal $V_{BIAS}$ that controls a supply-independent basic biasing current to the feedback opamp and to the diode network. As such, the biasing circuitry provides a first level of power supply regulation to minimize any noise that may be coupled from the power supply. The feedback opamp and the diode network circuit provide the second-level of supply regulation in generating the output voltage $V_{BANDGAP}$ and the reference current $I_{PTAT}$.

Circuit 28 is also self-starting, employing two levels of startup to ensure that a reliable startup occurs at all operating conditions. First, diode-connected transistors 216 and 218 ensure the generation of the basic current biasing for the entire circuit. Second, transistors 254 and 264 eliminate the second stable point of the feedback loop so that circuit 28 settles to a desired operating point.

The output current $I_{PTAT}$ supplied from terminal 270 is determined as follows:

$$I_{PTAT} = (V_T * \ln(N))/R_1, \text{ where:}$$

$V_T$ is the thermal voltage kT/q with k being the Boltzmann's constant, q the electronic charge and T the absolute temperature (degrees Kelvin); N is the ratio of the emitter area of transistor 242 to the emitter area of transistor 256; and $R_1$ is the resistance value of resistor 246. In this embodiment the integer N, i.e., the ratio of the size of transistor 242 compared to transistor 256, may be selected to have a value of 8.

The difference in base-emitter voltages of transistors 242 and 256 is the voltage potential across resistor 246 and equivalent to $V_T*\ln(N)$. The voltages VF1 and VF2 are supplied to the feedback opamp to generate an output voltage potential that is the difference of the input voltages. The output voltage potential controls the conduction currents of transistors 254 and 266 to reduce the nonlinearity in the current $I_{PTAT}$ conducted by transistor 266.

The output voltage $V_{BANDGAP}$ is determined as follows:

$$V_{BANDGAP}=V_{BE}+(R_2\ln(N))/R_1*V_T, \text{ where:}$$

$V_{BE}$ is the base-emitter voltage of transistor 242, $R_2$ is the resistance value of resistor 250; N is the ratio of the emitter area of transistor 242 to the emitter area of transistor 256; $R_1$ is the resistance value of resistor 246; and $V_T$ is the thermal voltage kT/q. Again, in this embodiment N may be selected to have a value of 8.

The Vbe of a bipolar transistor depends on the wafer fabrication process used to manufacture the transistor and on the temperature coefficient of the current flowing in the transistor. The amount of curvature depends on the temperature coefficients of the currents flowing through the base-emitter junctions of transistors 242 and 256. The present invention reduces the nonlinearity of the temperature variations of the currents conducted by transistors 242 and 256 (and the $V_{BE}$'s of those transistors) by using the feedback opamp to set the voltage across resistor 246. By reducing the voltage across resistor 246, the temperature generated Vbe changes of transistors 242 and 256 have been compensated.

By now it should be appreciated that the circuit and method of the present invention provide a stable and accurate reference voltage. The bandgap reference circuit provides a low cost bandgap reference voltage and a stable current that are substantially independent of changes in operating voltages and process characteristics.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system that generates entropy, comprising:
    a transceiver to receive a modulated signal;
    a processor coupled to the transceiver;
    a Static Random Access Memory (SRAM) memory coupled to the processor; and
    a bandgap voltage generator including a biasing section to provide the transceiver with a biasing voltage used to generate a bandgap voltage using first and second diode-connected transistors to separate a voltage at commonly connected gates of two N-channel transistors from a voltage at commonly connected gates of two P-channel transistors when the processor is not in a power conserving mode.

2. The system of claim 1, wherein the bandgap voltage generator further includes:
    a feedback amplifier;
    a diode network coupled to the feedback amplifier; and
    the biasing section to generate a bias voltage used by the feedback amplifier and the diode network to generate the bandgap voltage, wherein a signal from the processor disables the bias voltage.

3. The system of claim 2, wherein the biasing section further includes:
    the first and second N-channel transistors having commonly connected gates, with source terminals coupled to a ground power conductor; and
    a third N-channel transistor having conduction terminals that couple the commonly connected gates of the first and second N-channel transistors to the ground power conductor and a gate to receive the signal from the processor.

4. The system of claim 3, wherein the biasing section further includes:
    the first and second P-channel transistors having commonly connected gates, with source terminals coupled to a power conductor; and
    the first and second diode-connected transistors that couple the commonly connected gates of the first and second N-channel transistors to the commonly connected gates of the first and second P-channel transistors.

5. A method of conserving power in a device, comprising:
    powering a transceiver with a bandgap voltage, where the transceiver receives a modulated signal; and
    enabling a biasing section of a bandgap voltage generator to provide a biasing voltage used to generate the bandgap voltage using first and second diode-connected transistors to separate a voltage at commonly connected gates of two N-channel transistors from a voltage at commonly connected gates of two P-channel transistors when the device is not in a power conserving mode and disabling the biasing section when the device is in a power conserving mode.

6. The method of claim 5, wherein powering the transceiver further includes:
    supplying the bandgap voltage to an Analog-to-Digital Converter (ADC) in a receiver that receives the modulated signal.

7. The method of claim 5, wherein powering the transceiver further includes:
    supplying the bandgap voltage to a Digital-to-Analog Converter (DAC) in a transmitter of the transceiver.

8. The method of claim 7, wherein disabling the biasing voltage when the device is in a power conserving mode further includes:
    pulling the gate voltage of commonly connected gates of the two N-channel transistors to ground.

9. The method of claim 5, further including:
    using the bandgap reference generator for supplying a Proportional-To-Absolute-Temperature (PTAT) current to the transceiver when the device is not in a power conserving mode.

* * * * *